US009966978B2

(12) United States Patent
Jian

(10) Patent No.: US 9,966,978 B2
(45) Date of Patent: May 8, 2018

(54) RADIO FREQUENCY MULTIPLEXER AND RECEIVER FILTER

(71) Applicant: Telefonaktiebolaget LM Ericsson (Publ), Stockholm (SE)

(72) Inventor: Chunyun Jian, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/321,546

(22) PCT Filed: Jul. 23, 2014

(86) PCT No.: PCT/IB2014/063355
§ 371 (c)(1),
(2) Date: Dec. 22, 2016

(87) PCT Pub. No.: WO2016/012837
PCT Pub. Date: Jan. 28, 2016

(65) Prior Publication Data
US 2017/0214417 A1    Jul. 27, 2017

(51) Int. Cl.
*H04B 1/52* (2015.01)
*H04B 1/00* (2006.01)
*H04W 72/04* (2009.01)
*H04W 52/52* (2009.01)

(52) U.S. Cl.
CPC ............. *H04B 1/0057* (2013.01); *H04B 1/52* (2013.01); *H04W 52/52* (2013.01); *H04W 72/0453* (2013.01)

(58) Field of Classification Search
CPC ................. H04B 1/0057; H04B 1/52
See application file for complete search history.

(56) References Cited

U.S. PATENT DOCUMENTS

| 6,664,871 B2 | 12/2003 | Yip |
| 6,710,813 B1 * | 3/2004 | Grandchamp ........ H01P 1/2138 333/126 |
| 6,784,759 B2 | 8/2004 | Maekawa et al. |

(Continued)

FOREIGN PATENT DOCUMENTS

WO    2006121402 A1    11/2006

OTHER PUBLICATIONS

International Search Report and Written Opinion dated May 7, 2015 for International Application Serial No. PCT/IB2014/063355, International Filing Date: Jul. 23, 2014 consisting of 12-pages.

*Primary Examiner* — Tuan H Nguyen
(74) *Attorney, Agent, or Firm* — Christopher & Weisberg, P.A.

(57) ABSTRACT

A multi-band RF multiplexer for routing transmit and receive signals in a radio RF front end. According to one aspect, the disclosure provides a multiplexer for routing transmit signals to an antenna and routing receive signals to a receiver. The multiplexer provides a first hybrid coupler having a first frequency response and a second hybrid coupler having a second frequency response. The second hybrid coupler is coupled to the first hybrid coupler by a plurality of splitters. The second frequency response complements the first frequency response to increase cancellation of two signals arriving at an output port of the second hybrid coupler from two different paths through the first and second hybrid couplers.

18 Claims, 18 Drawing Sheets

(56) References Cited

U.S. PATENT DOCUMENTS

| | | |
|---|---|---|
| 7,684,759 B2 | 3/2010 | Yutkowitz |
| 8,022,787 B2 | 9/2011 | Inoue et al. |
| 9,048,805 B2 * | 6/2015 | Granger-Jones ....... H04B 1/525 |
| 2013/0083703 A1 | 4/2013 | Granger-Jones et al. |

* cited by examiner (Embodiment 1)

(Embodiment 2)

(Embodiment 3)

RADIO FREQUENCY MULTIPLEXER AND RECEIVER FILTER

CROSS-REFERENCE TO RELATED APPLICATIONS

This Application is a Submission Under 35 U.S.C. § 371 for U.S. National Stage Patent Application of International Application No. PCT/IB2014/063355, filed Jul. 23, 2014 entitled "RADIO FREQUENCY MULTIPLEXER AND RECEIVER FILTER," the entirety of which is incorporated herein by reference.

FIELD

The present disclosure relates to radio transceivers and more particularly, to multiplexing transmit and receive signals, and filtering receive signals.

BACKGROUND

Antennas for radio base stations are physically large compared to other radio components, but typically have relatively wider bandwidth. Therefore, it is preferable to have multiple transmit (TX) bands and receive (RX) bands share an antenna so that the number of antennas can be minimized.

In order to share an antenna a multiplexer is typically used. FIG. 1 shows a conventional 4-band multiplexer 10 that couples two transmit signals and two receive signals to an antenna 12. Each of the transmit signals and the receive signals pass through a respective filter 14, 16. For high-power base stations, air cavity filters having low passive intermodulation (PIM) may be employed to implement the multiplexer 10. However, for low-power base stations transmitting and receiving in small cells, these air cavity filters are too large and miniature filters are preferred. Such miniature filters are typically acoustic filters such as surface acoustic wave (SAW), bulk acoustic wave (BAW) and thin-film bulk acoustic resonator (FBAR) filters, or are ceramic filters. However, these types of filters have limited PIM performance, even at low power. Thus, as shown in FIG. 1, the transmitter filters 14 undesirably end up feeding PIM to receive circuits via the receive filters 16, thereby reducing receiver sensitivity.

FIG. 2 shows a type of 4-band multiplexer that exhibits low PIM. In FIG. 2, two transmit signals, TX1 and TX2, are combined by a combiner 18 and input to port 7 of the lower 3 dB 90 degree hybrid coupler 20. The combined signal travels via two different paths through the lower hybrid coupler 20. A first path is from port 7 to port 5 (the direct port), and a second path is from port 7 to port 6 (the coupled port). The signal from port 5 passes through a dual band TX band pass filter 22 and is input to port 4 of the upper 3 dB 90 degree hybrid coupler 24. The signal from port 6 passes through a dual band TX band pass filter 26 and is input to port 3 of the upper hybrid coupler 24. The signal arriving at port 4 from the TX band pass filter 22 travels via two different paths through the upper hybrid coupler 24. The first path is from port 4 to port 1 to an antenna 28. The second path is from port 4 to port 2. Similarly, the signal arriving at port 3 of the upper hybrid coupler 24 travels via two paths. The first path is from port 3 to port 1 and to the antenna 28. The second path is from port 3 to port 2. The signals from port 2 are passed through a dual band RX band reject filter (BRF) 30 and split into receive signals RX1 and RX2 by a 2-band splitter 32.

Ideally, the two TX BPFs are identical. Also, the signal travelling from port 7 to port 5, i.e., the direct port, has a 90 degree phase difference with the signal travelling from port 7 to port 6, i.e., the coupled port. Similarly, in the upper hybrid coupler 24, for the input at port 4, the output at the direct port 2 has a 90 degree phase difference with the signal at the coupled port 1. Thus, the signal from port 7 to port 5 to the TX BPF 22 to port 4 to 2 will ideally be 180 degrees out of phase with the signal from port 7 to 6 to the TX BPF 26 to port 3 to 2. Thus, the signals of these two paths will cancel each other. Conversely, the two signals that reach port 1 will add constructively since they are in phase.

A signal received by the antenna 28 at port 1 will be split in two signals, one traversing from port 1 to 4 (the coupled port) and one traversing from port 1 to port 3 (the direct port). The signal arriving at port 4 will be reflected due to the receive band rejection of the TX BPF 22. The reflected signal will be reflected back to port 1 and will also be reflected to port 2. Similarly, the signal arriving at port 3 will be reflected due to the receive band rejection of the TX BPF 26. This reflected signal will be reflected back to port 1 and will also be reflected to port 2. The signal that traverses from port 1 to port 4 to port 2 will add constructively at port 2 with the signal that traverses from port 1 to port 3 to port 2. Conversely, the two signals reflected back to port 1 will destructively interfere and cancel.

The above discussion assumes that the hybrid couplers provide a 90 degree phase shift and equal splitting of the signal power over the entire relevant frequency band. Further, the above discussion assumes a flat amplitude frequency response that is the same for the path to direct port and a path to a coupled port. In reality, the hybrid couplers may have a frequency response as shown in FIG. 3. As shown in FIG. 3 the frequency response 34 of the coupler direct port is concave down, whereas the frequency response 36 of the coupler coupled port is concave up. At the lower frequency of the lower transmit band TX1, the difference between the coupling between the direct port and the coupled port is about 0.35 dB. Thus, if the lower and upper hybrid couplers 20 and 24 have the response shown in FIG. 3, the signal that traverses from port 7 to 6 to 3 to 2 at frequency F1 would have power about 0.7 dB higher than the power of the signal that traverses from port 7 to 5 to 4 to 2. This results in leakage of the TX1 band signal near frequency F1 of about 10 dB into the receive path. At the same time, this also results in an insertion loss of the path from port 7 to port 1 of about 0.1 to 0.3 dB. Further, as shown in FIG. 3, the output power difference between the coupled port and the direct port gets bigger as the frequency decreases. This means that PIM generated by the dual band TX BPFs 22, 26 will be exacerbated when the receive band is on the lower side of the transmit band, which is often the case. Further, since a dual band BPF has a higher insertion loss than a single band BPF, the multiplexer configuration of FIG. 2 has a high insertion loss.

For low power radio base stations, resonator-type ceramic filters, such as coaxial ceramic filters, monoblock filters, and ceramic waveguide filters, etc., are sometimes used for RF filtering of the received signal. However, for some applications, ceramic filters are too bulky and too expensive. Miniature SAW, BAW or FBAR filters have therefore been proposed for use. FIG. 4 shows an example of such proposal. FIG. 4 shows an antenna 38, a first acoustic filter 40, a low noise amplifier 42, and a second acoustic filter 44. These filters 40 and 44 together in series show a large amplitude variation in the pass band of their frequency response, as shown in FIG. 5. FIG. 5 shows a typical pass band frequency response of the circuit of FIG. 4. The pass band variation is greater than 2 dB. Further, insertion loss is highest at the pass band edges and lowest at around the center of the pass band. Further, the configuration of FIG. 4 does not provide sufficient out of band rejections.

As shown in FIG. 6, the total receive front end out-of-band filtering performance 46 of the configuration of FIG. 4 does not meet the rejection filter rejection envelope requirements 48 set out in known wireless communication standards. This deficiency is common to all acoustic wave filters. The problem of poor out-of-band rejection cannot be resolved by changing the acoustic filter design. In general, a single acoustic filter can only provide 10 to 20 dB of rejection at above-band frequencies. Two such filters can be expected to achieve only 20 to 40 dB of rejection at above-band frequencies.

SUMMARY

The present disclosure advantageously provides a method and system for routing transmit and receive signals in a radio RF front end. According to one aspect, the disclosure provides a multi-band radio frequency, RF, multiplexer for routing transmit signals to an antenna and routing receive signals to a receiver. The multiplexer includes a first hybrid coupler providing four ports, a first port configured to connect to an antenna, a second port being an input port and configured to receive an N-band transmit signal. The multiplexer further includes a first M-band splitter connected to a third port of the first hybrid coupler, the first M-band splitter having a first set of M outputs, M being a positive integer greater than one. The multiplexer also includes a second M-band splitter connected to a fourth port of the first hybrid coupler, the second M-band splitter having a second set of M outputs. The multiplexer includes a plurality of hybrid couplers each providing four ports, a first port being connected to one of the first set of M outputs, and a second port being connected to one of the second set of M outputs. Each of the plurality of hybrid couplers has a third port being an output port and configured to output one of M receive signals for one of M receive circuits and a fourth port connected to one of M loads.

According to this aspect, in some embodiments, each of the first and the plurality of hybrid couplers is a 3 DB 90 degree hybrid coupler. In some embodiments, each of the plurality of hybrid couplers has a frequency response that complements a frequency response of the first hybrid coupler in a respective band so that a combined frequency response of the first hybrid coupler and one of the plurality of hybrid couplers causes cancellation of two signals arriving at an output port of the one of the plurality of hybrid couplers from two different paths through the hybrid couplers. In some embodiments, the first and second M splitters each have M filters and each filter of the first M-band splitter has a frequency response that corresponds to a frequency response of a corresponding filter of the second M-band splitter. In some embodiments, at least one of the M receive circuits includes a cascade of at least one amplifier followed in series by at least one ceramic multi-layer filter module. In these embodiments, each filter of the first M-band splitter and each filter of the second M-band splitter may include an acoustic filter. In these embodiments, an out-of-band frequency rejection characteristic of the at least one ceramic multilayer filter module may exceed an out-of-band frequency rejection characteristic of each of a corresponding two of the 2M acoustic filters. In some embodiments, a pass band frequency characteristic of the at least one ceramic multilayer filter module varies less than a pass band frequency characteristic of a corresponding one of the acoustic filters. In some embodiments, the first M-band splitter includes M band pass filters, each band pass filter of the first M-band splitter passing a different one of the M receive signals and rejecting the N-band transmit signal. In some embodiments, the second M-band splitter includes M band pass filters, each band pass filter of the second M-band splitter corresponding to a band pass filter of the first M-band splitter.

According to another aspect, the disclosure provides a multi-band radio frequency, RF, multiplexer for routing transmit signals to an antenna and routing receive signals to a receiver. The multiplexer includes a first hybrid coupler providing four ports, a first port being an output port connected to an N band splitter configured to produce N receive signals to couple to N receive circuits, the first hybrid coupler having a second port connected to the antenna. The multiplexer also includes a first M-band combiner connected to a third port of the first hybrid coupler, the first M-band combiner having a first set of M inputs, M being a positive integer greater than one. The multiplexer also includes a second M-band combiner connected to a fourth port of the first hybrid coupler, the second M-band combiner having a second set of M inputs. The multiplexer further includes a plurality of hybrid couplers each providing four ports, a first port being connected to one of the first set of M inputs, and a second port being connected to one of the second set of M inputs. Each of the plurality of hybrid couplers has a third port being an input port and connected to one of M transmit circuits and a fourth port connected to one of M loads.

According to this aspect, in some embodiments, each of the first and the plurality of hybrid couplers is a 3 dB 90 degree hybrid coupler. In some embodiments, the plurality of hybrid couplers has a frequency response that complements a frequency response of the first hybrid coupler in a respective band so that a combined frequency response of the first hybrid coupler and one of the plurality of hybrid couplers causes cancellation of two signals arriving at an output port of the first hybrid coupler from two different paths through the hybrid couplers. In some embodiments, at least one of the N receive circuits includes a cascade of at least one amplifier followed in series by at least one ceramic multi-layer filter module, a first one of the at least one amplifier having an input electrically coupled to a respective Nth output of the N-band splitter. In some embodiments, the N-band splitter comprises a plurality of acoustic filters, one acoustic filter for each of the N receive signals. In these embodiments, at least one of the N receive signals may be coupled to a cascade of at least one amplifier followed in series by at least one ceramic multilayer filter module. In these embodiments, an out-of-band frequency rejection characteristic of the at least one ceramic multilayer filter module exceeds an out-of-band frequency rejection characteristic of a corresponding one of the N acoustic filters. In these embodiments, a pass band frequency characteristic of the at least one ceramic multilayer filter module may vary less than a pass band frequency characteristic of a corresponding one of the acoustic filters. In some embodiments, the first M-band combiner include M band pass filters, each band pass filter of the first M-band combiner passing a different one of M transmit signals and rejecting the N receive signals. In some embodiments, the second M-band combiner includes M band pass filters, each band pass filter of the second M-band combiner corresponding to a band pass filter of the first M-band combiner.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
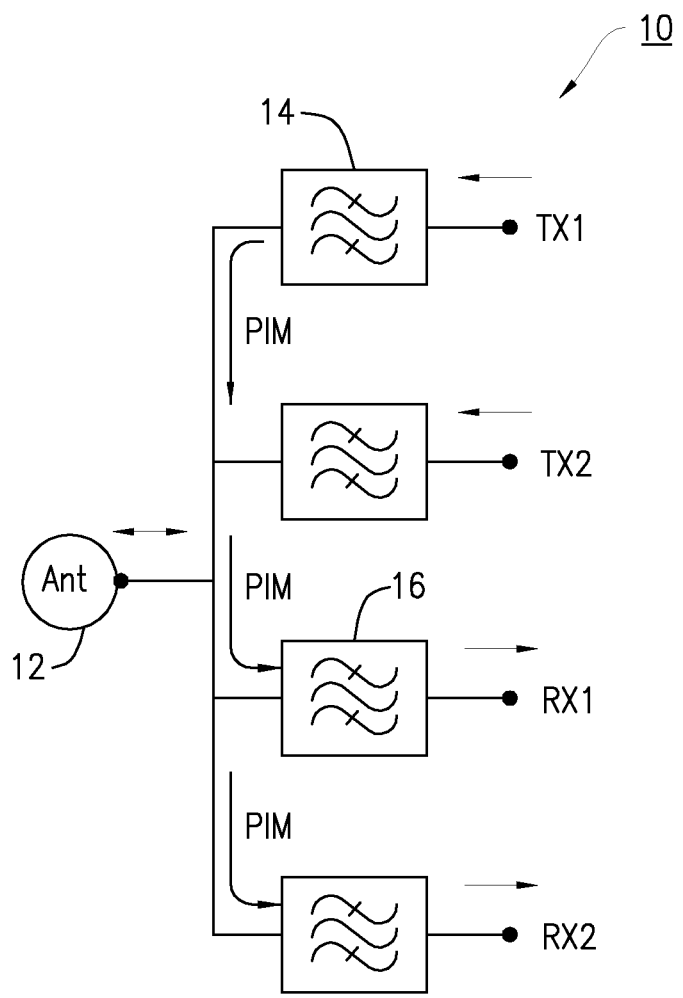
FIG. 1 is a block diagram of a known four band multiplexer.
Figure 2:
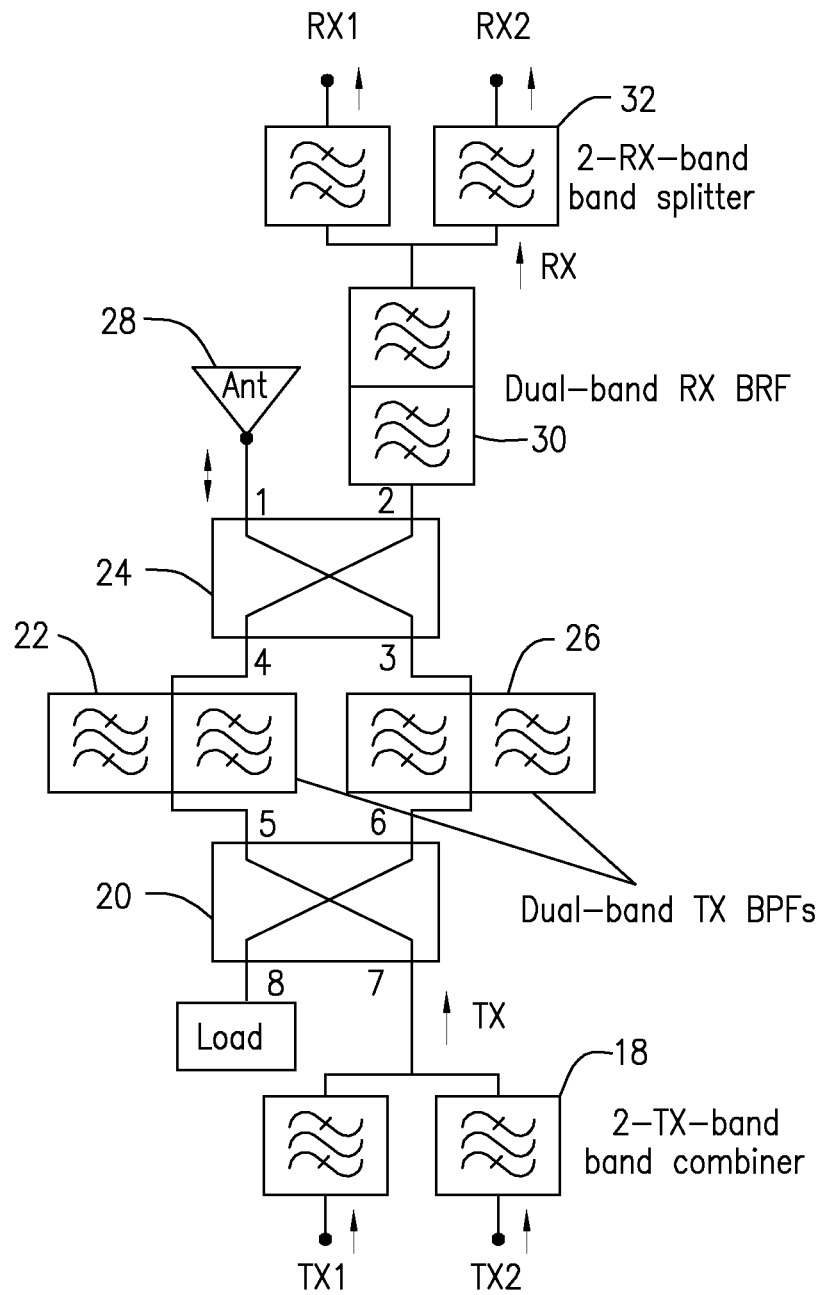
FIG. 2 is a block diagram of a known low PIM four band multiplexer.
Figure 3:
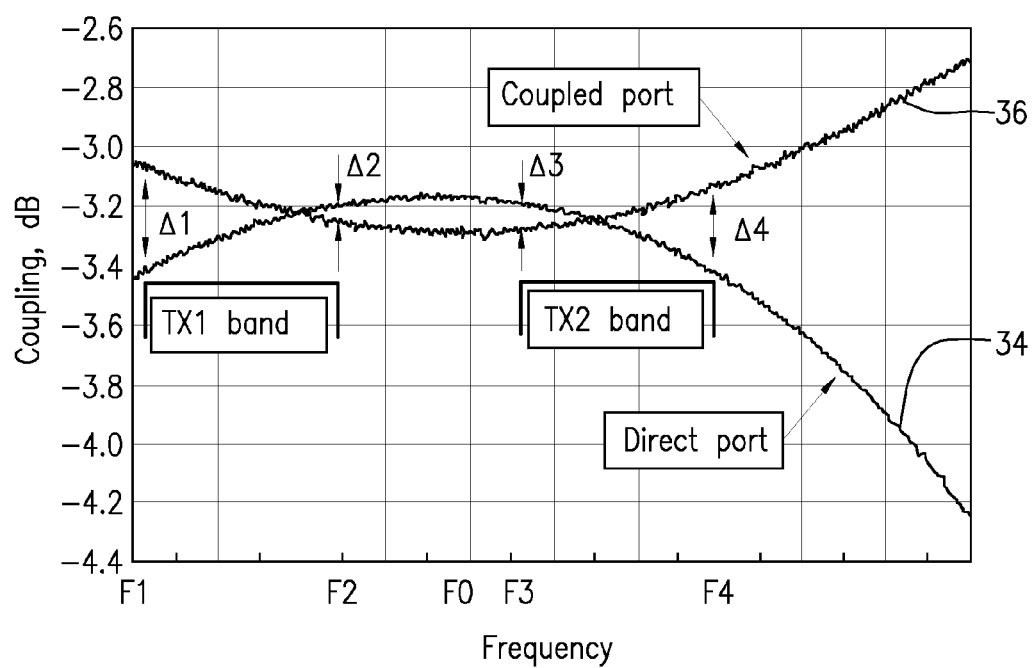
FIG. 3 is a graph of a frequency response of a known hybrid coupler.

Before describing in detail exemplary embodiments that are in accordance with the present disclosure, it is noted that the embodiments reside primarily in combinations of apparatus components and processing steps related multiplexing transmit and receive signals and filtering receive signals in a radio. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 7:
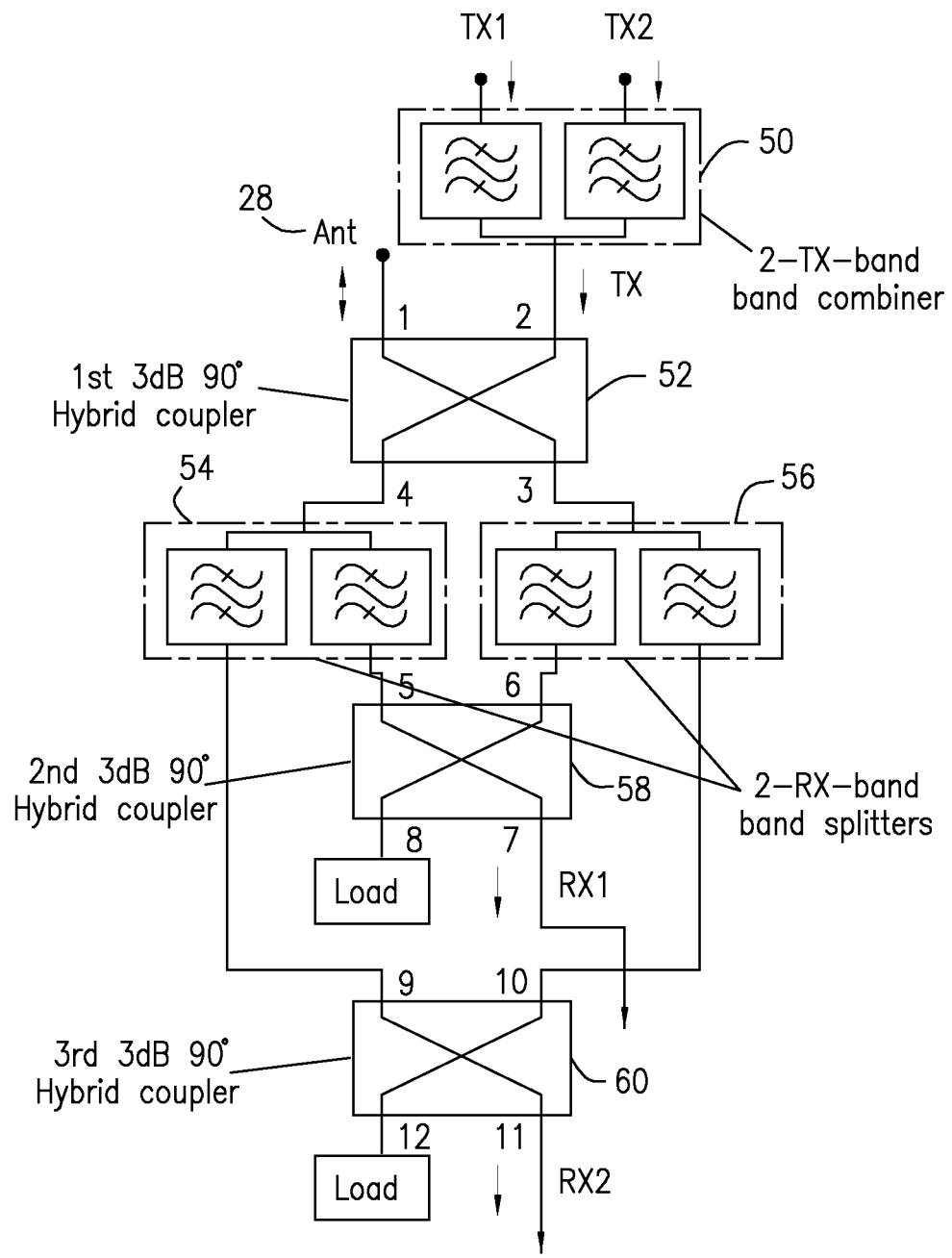
FIG. 7 is a block diagram of one embodiment of a four band multiplexer constructed in accordance with principles of the present disclosure.

Referring now to the drawing figures, where like reference designators refer to like elements, there is shown in FIG. 7 a four band multiplexer constructed in accordance with principles of the present disclosure. As is shown in FIG. 7, two independent transmit signals, TX1 and TX2, are combined by a dual band combiner 50. The combined output of the dual band combiner 50 is input to port 2 of a first 3 dB 90 degree hybrid coupler 52. These signals are reflected at ports 3 and 4 and added in phase at the port 1 and coupled to the antenna 28.

Two receive signals in different bands, RX1 and RX2, are received by the antenna 28 and input to port 1 of the first hybrid coupler 52. These signals are split to port 3 (direct port) and to port 4 (coupled port). The RX1 signal at port 4 is coupled to port 5 of a second hybrid coupler 58 via a splitter 54. The RX2 signal at port 4 is coupled to port 9 of a third hybrid coupler 60. Similarly, the RX1 signal at port 3 is coupled to port 6 of the second hybrid coupler 58 via a splitter 56. The RX2 signal at port 3 is coupled to port 10 of the third hybrid coupler 60. The signal RX1 received at ports 5 and 6 are coupled to output port 7 of the second hybrid coupler 58. Likewise, the signal RX2 received at ports 9 and 10 are coupled to output port 11 of the third hybrid coupler 60.

Figure 8:
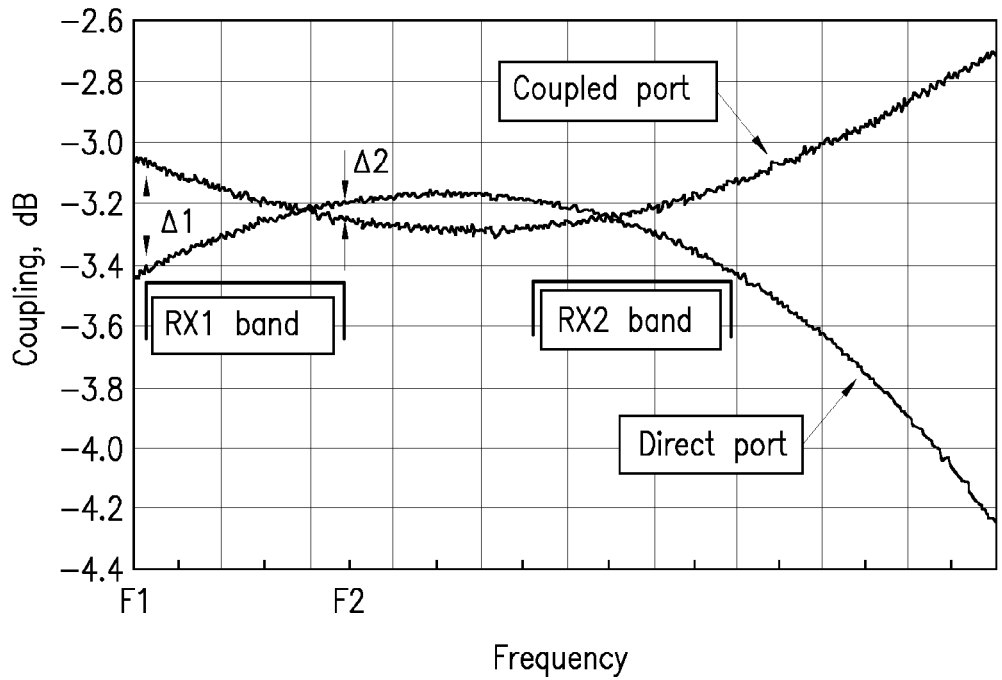
FIG. 8 is a graph of a coupling response of a first hybrid coupler of the configuration of FIG. 7 showing receive band 1.
Figure 9:
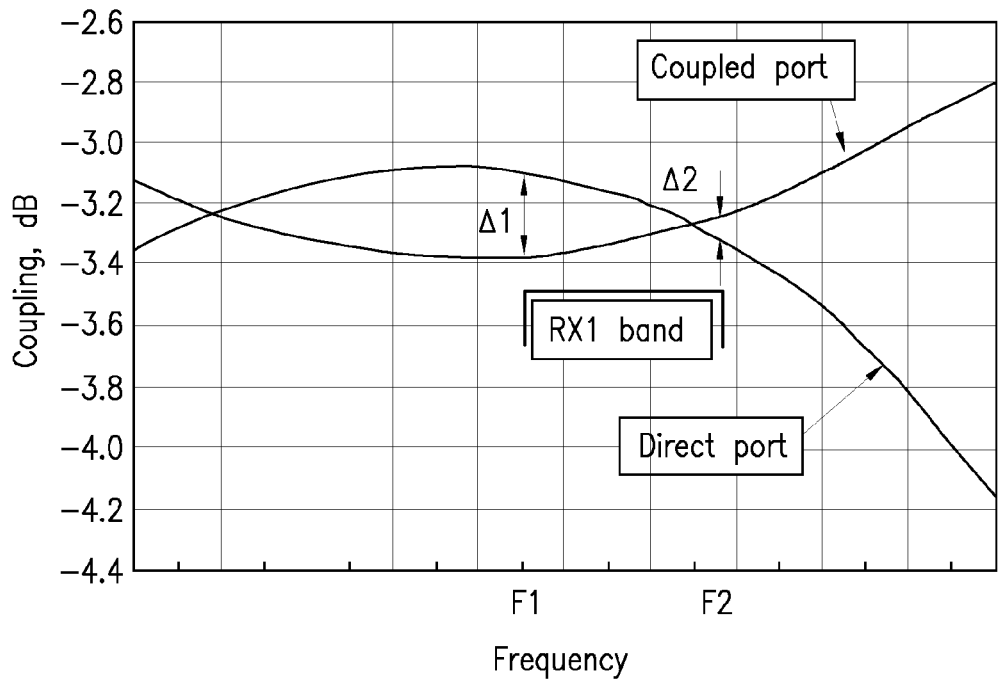
FIG. 9 is a graph of a coupling response of a second hybrid coupler of the configuration of FIG. 7 showing a complementary response for receive band 1.

FIG. 8 is a graph of the frequency response of the first hybrid coupler 52 and FIG. 9 is a graph of the frequency response of the second hybrid coupler 58. FIG. 8 shows that for an input signal at port 2 of the first hybrid coupler 52, the coupled port 3 has about 0.35 dB higher power at the lower band edge F1 than the signal at direct port 4. At the higher band edge F2, the power at the coupled port 3 is about 0.08 dB lower than the power at the direct port 4. In order to offset these power differences, the frequency response of the second hybrid coupler 58 is the complement of the frequency response of the first hybrid coupler 52. Thus, as shown in FIG. 9, the coupled port power is about 0.35 dB lower than the direct port power at the lower frequency F1, and the coupled port power is about 0.08 dB higher than the direct port power at the higher frequency F2. Therefore, when a signal traverses both the first and second hybrid couplers, the difference in power between the direct and coupled paths in the first hybrid coupler are about exactly offset by the difference between the direct and coupled paths in the second hybrid coupler. Thus, the frequency responses of the first and second hybrid couplers are said to be complementary.

Figure 10:
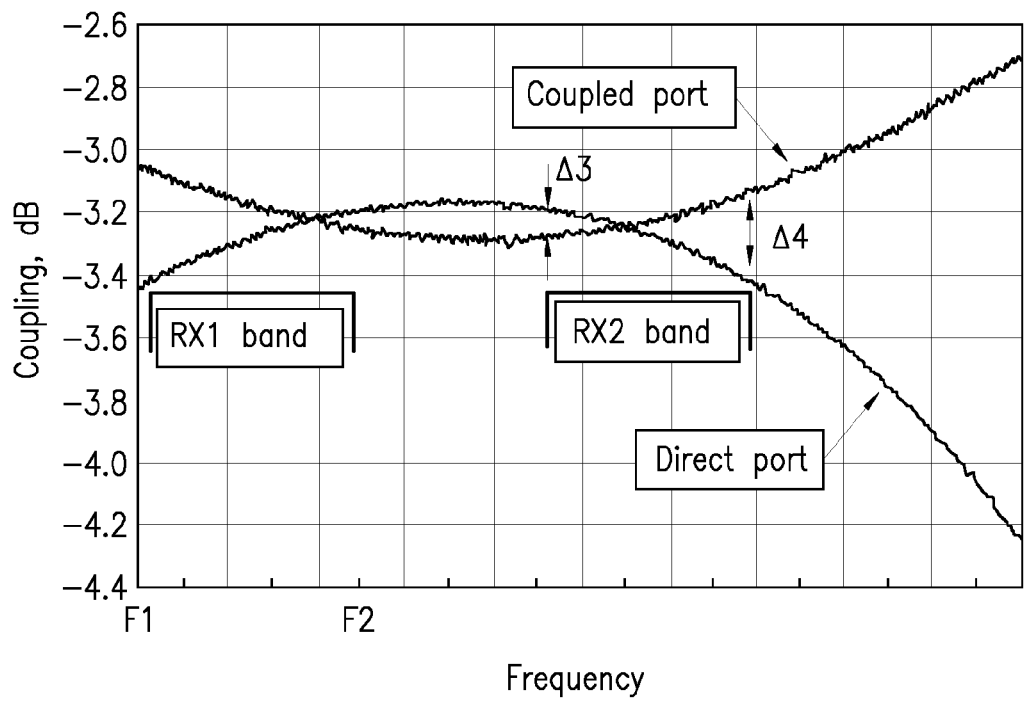
FIG. 10 is graph of the coupling response of the first hybrid coupler of the configuration of FIG. 7 showing receive band 2.
Figure 11:
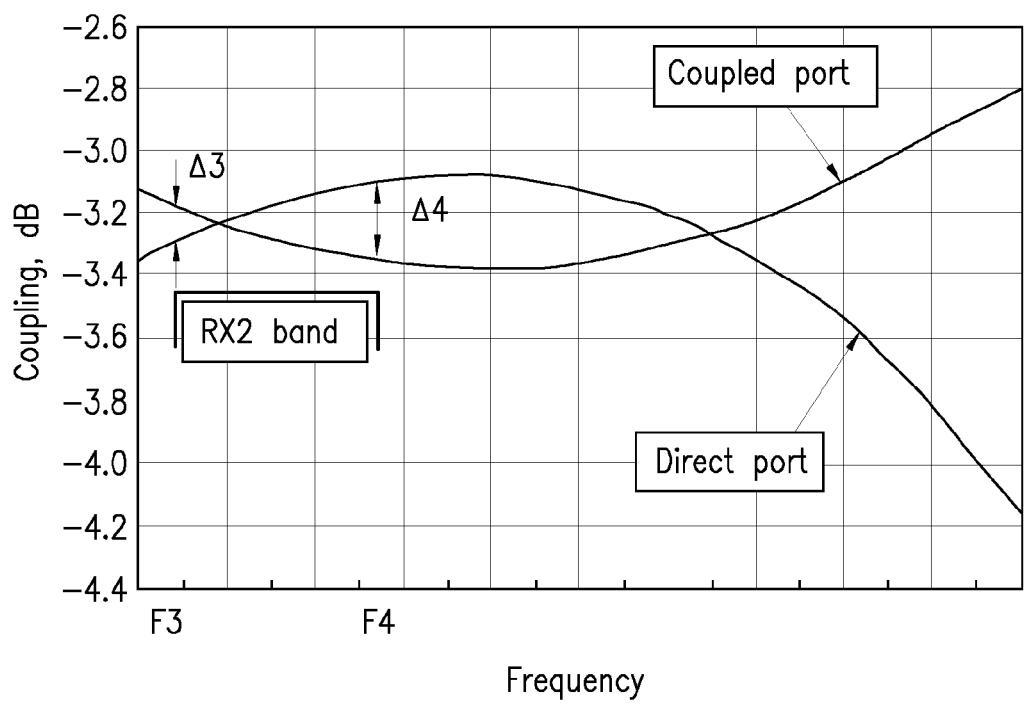
FIG. 11 is a graph of the coupling response of a third hybrid coupler of the configuration of FIG. 7, showing a complementary response for receive band 2.

FIG. 10 is a graph of the frequency response of the first hybrid coupler 52, showing the second receive band, RX2, and FIG. 11 is a graph of the frequency response of the third hybrid coupler 60. These figures show that the frequency responses of the first and third hybrid couplers are complementary with respect to the second receive band RX2 between frequencies F3 and F4. For example, the difference between the coupling of the direct port path and the coupling of the coupled port path at frequency F3 of the first hybrid coupler is about exactly offset by the coupling of the direct port path and the coupling of the coupled port path of the third hybrid coupler. The same is true for the coupling of the two hybrid couplers at frequency F4.

Thus, the two TX signals arriving from different paths to port 7 of the second hybrid coupler 58 will have almost the same power level across the entire RX1 band. Therefore, the two parts of the signals in the RX1 band will get better cancellation at the port 7 than when the frequency responses of the two hybrid couplers are not complementary, which means that any PIM generated by the TX1 and TX2 filters of the combiner 50 that fall into the RX1 band will be well-cancelled. The same holds true for the RX2 band at port 11 of the third hybrid coupler 60. Further, since the antenna receiving signals arriving at load ports 8 and 12 will be well-cancelled due to the complementary frequency responses of the first and second hybrid couplers, and the first and third hybrid couplers, as a result of the improved cancellation, the insertion loss between the antenna port 1 and the RX ports 7 and 11 will be lower than would be if the frequency responses of the two hybrid couplers were not complementary.

Figure 12:
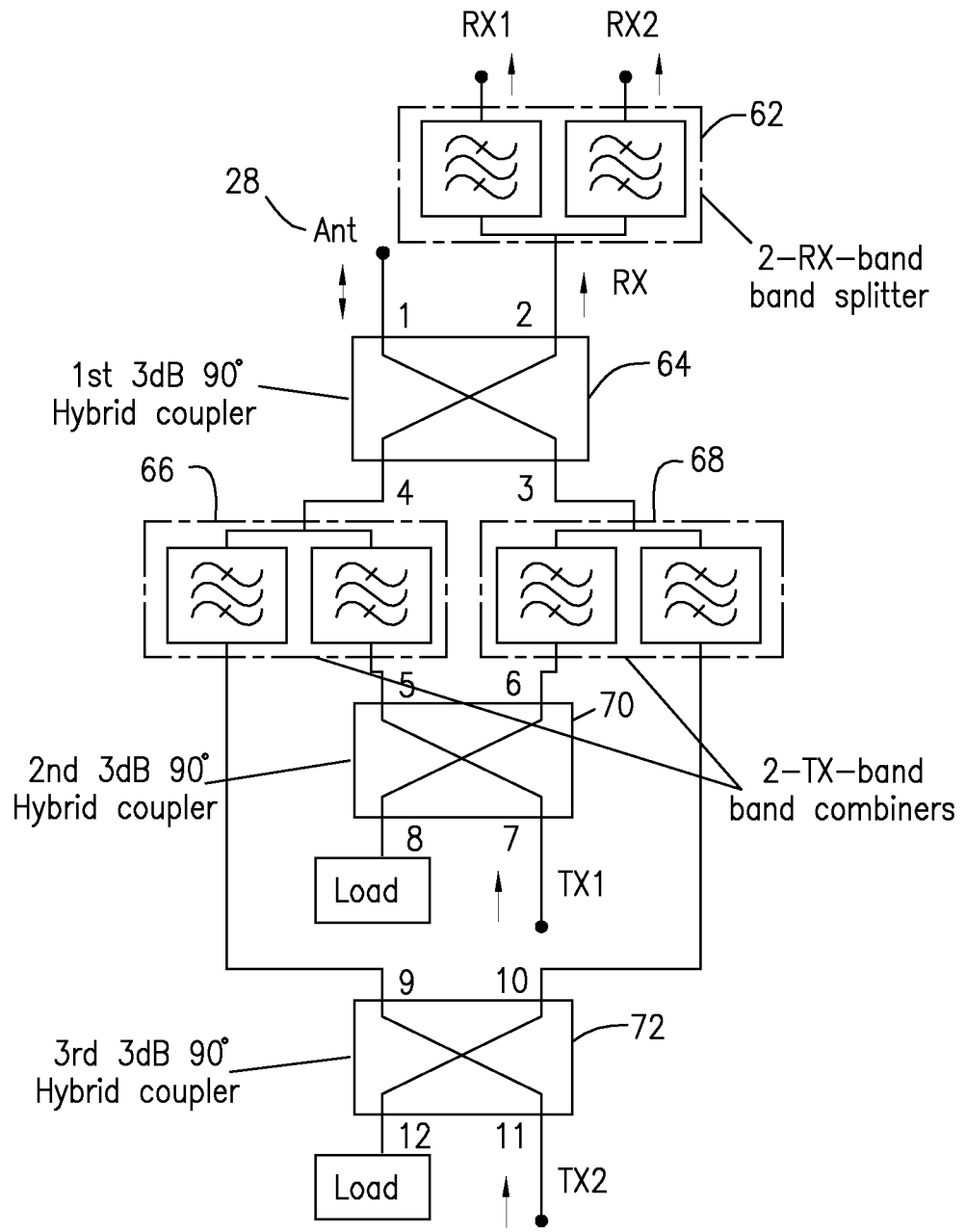
FIG. 12 is a block diagram of another embodiment of a four band multiplexer constructed in accordance with principles of the present disclosure.

FIG. 12 is a block diagram of another embodiment of a four band multiplexer having signal cancellation analogous to the signal cancellation of the circuit of FIG. 7. In the circuit shown in FIG. 12, a band splitter 62 splits a signal having two receive bands, RX1 and RX2. Each output of the splitter 62 may be input into a low noise amplifier (LNA) and a ceramic multilayer filter module. The operation of the LNA and ceramic multilayer filter module are discussed in detail below. The first hybrid coupler 64 has an input port 1 electrically connected to an antenna 28. The receive signals, RX1 and RX2, at port 1 propagate to ports 3 and 4 and are reflected back to port 2 and fed to the splitter 62. A second hybrid coupler 70 receives a transmit signal TX1, which is coupled from port 7 to ports 5 and 6. A third hybrid coupler 72 receives a transmit signal TX2, which is coupled from port 11 to ports 9 and 10. The signal TX1 from port 5 is combined with the signal TX2 from port 9 by a combiner 66. The signal TX1 from port 6 is combined with the signal TX2 from port 10 by a combiner 68. The combined signals from ports 5 and 9 are received by port 4 of the first hybrid coupler 64 and the combined signals from ports 6 and 10 are received by port 3 of the first hybrid coupler 64. The signals from ports 4 and 3 combine destructively at port 2 and add constructively at port 1, where the transmitted signals are transmitted by the antenna 28.

Just as the frequency responses of the first and second hybrid couplers 52 and 58 of the circuit of FIG. 7 are complementary and produce a substantially flat composite frequency response for the signals traveling through both couplers, the frequency responses of the first and second hybrid couplers 64 and 70, respectively, of the circuit of FIG. 12 are complementary to produce a substantially flat composite frequency response for the signals traveling through both couplers 64 and 70. Similarly, the frequency responses of the first and third couplers 64 and 72 are complementary and produce a substantially flat composite frequency response for the signals traveling through both of these couplers. It is noted that, in this arrangement, the receive paths are well isolated from the transmit path high power signals. This is the case because the cancellation achieved for the signals traversing the pass bands of the two TX band combiners 66 and 68, respectively, of the circuit shown in FIG. 12 is greater than the cancellation achieved for TX band signals encountering a reject band of the splitters 54 and 56 of the circuit shown in FIG. 7.

Figure 13:
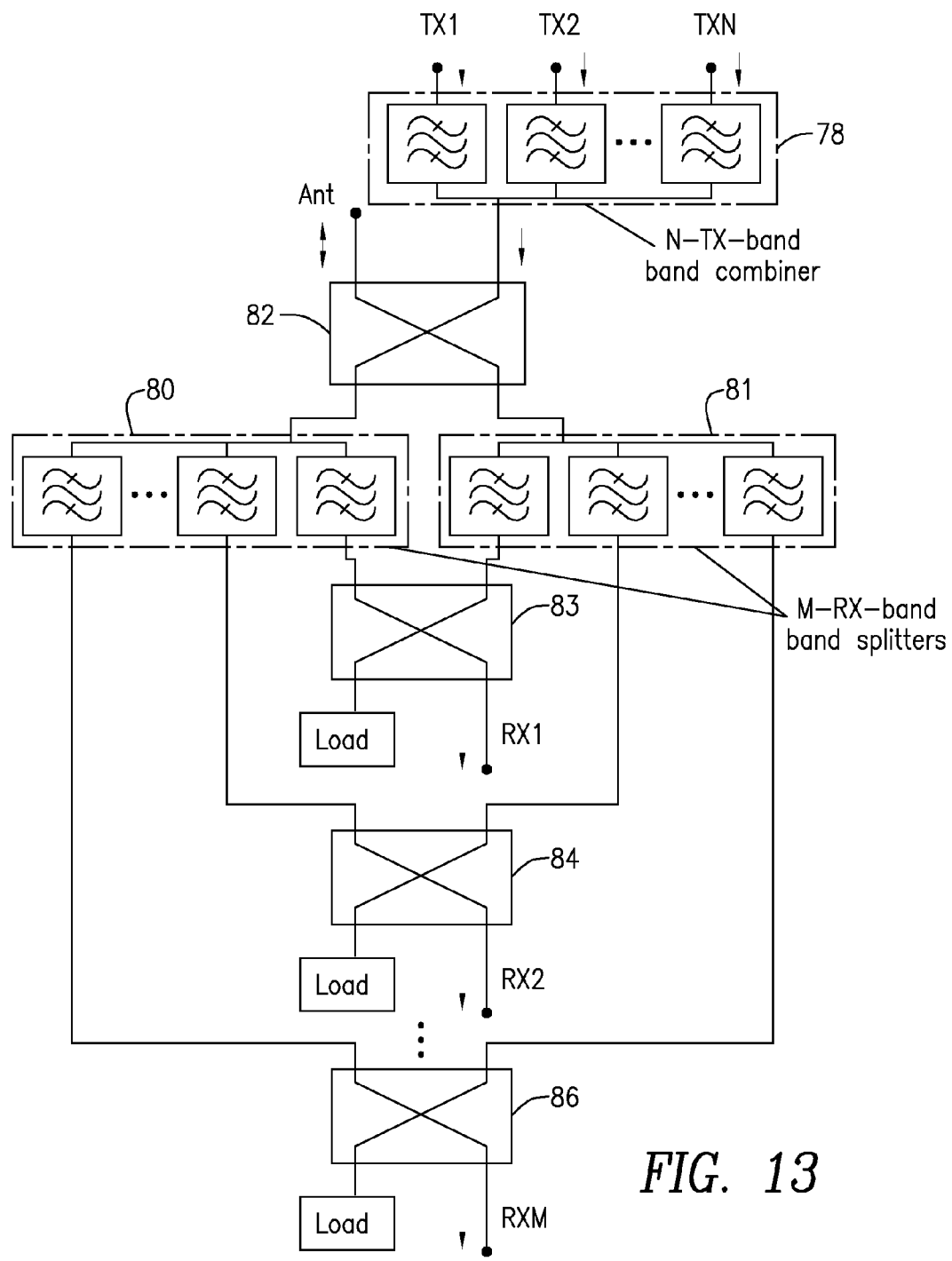
FIG. 13 is a block diagram of one embodiment of a multiband multiplexer constructed in accordance with principles of the present disclosure.
Figure 14:
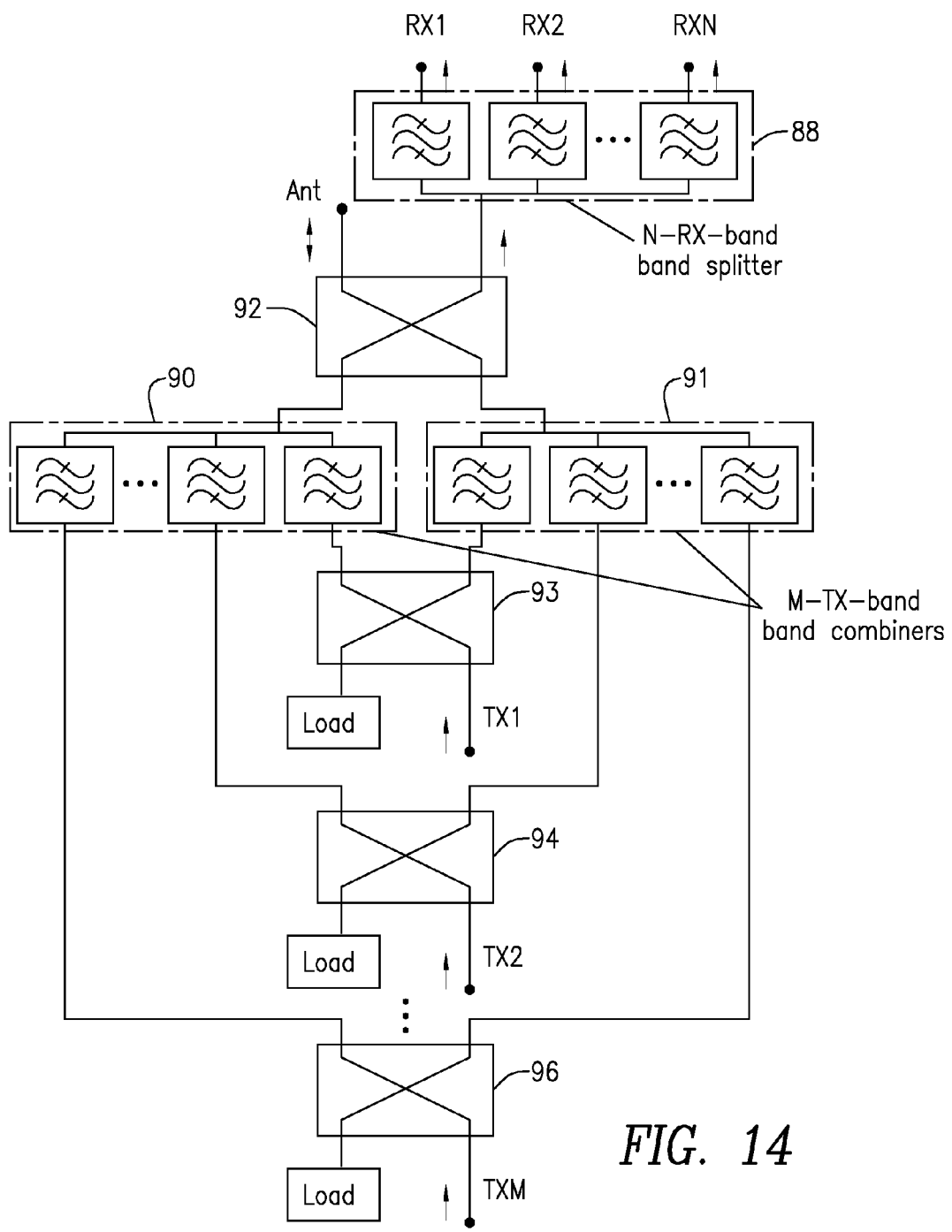
FIG. 14 is a block diagram of an alternative embodiment of a multiband multiplexer constructed in accordance with principles of the present disclosure.

FIGS. 13 and 14 are circuit block diagrams that illustrate the concepts described above with respect to FIGS. 7 and 12, respectively, extended to more than four bands. In particular, FIG. 13 shows a multiplexer for N transmit bands and M receive bands. The N transmit bands are combined by an N-band combiner 78 and the M receive bands are split by two sets of M-band splitters 80 and 81. Similarly, FIG. 14 shows a multiplexer for N receive bands and M transmit bands, where the N receive bands are split by an N-band splitter 88 and the M transmit bands are combined by two M-band combiners 90 and 91. In the circuit diagram of FIG. 13, the hybrid coupler 82 has a complementary frequency response with respect to hybrid couplers 83, 84 and 86. More particularly, the frequency response of the Mth hybrid coupler for the Mth receive band, RXM, is the complement of the frequency response of the hybrid coupler 82 for the Mth receive band. Similarly, in the circuit shown in FIG. 14, the hybrid coupler 92 has a complementary frequency response with respect to hybrid couplers 93, 94 and 96. More particularly, the frequency response of the Mth hybrid coupler for the Mth transmit band, TXM, is the complement of the frequency response of the hybrid coupler 92 for the Mth transmit band.

The multiband multiplexer solutions described above enable the achievement of low PIM and high transmit-receive port isolation, and provide flexibility in the choice of filters for the TX and RX paths. For example, a high power filter ceramic filter with relatively large size can be selected for the transmit path, while the receive path filters can be selected to be low power, small-sized acoustic filters. Also, for the embodiments of FIGS. 7 and 13, the splitters 54 and 56 of FIG. 7 and 80 and 81 of FIG. 13 may include acoustic filters combined onto the same module as the 3 dB 90 degree hybrid coupler 52 of FIG. 7 and of hybrid coupler 82 of FIG. 13, respectively.

Thus, according to one aspect, the disclosure provides a method of routing transmit signals to an antenna and routing receive signals to a receiver. The method includes providing a first hybrid coupler having a first frequency response and a second hybrid coupler having a second frequency response. The second hybrid coupler is coupled to the first hybrid coupler by a plurality of splitters. The second frequency response complements the first frequency response to cause cancellation of two signals arriving at an output port of the second hybrid coupler from two different paths through the first and second hybrid couplers.

According to this aspect, in some embodiments, the first hybrid coupler has a first port connected to an antenna, a second port connected to a combiner that combines transmit signals, a third port connected to an input port of a first one of the plurality of splitters and a fourth port connected to an input port of a second one of the plurality of splitters. In these embodiments, the second hybrid coupler may have a first port connected to an output port of the first one of the plurality of splitters and a second port connected to an output port of the second one of the plurality of splitters. In these embodiments, the second hybrid coupler has a third port connected to a receiver circuit and a fourth port connected to a load.

According to another aspect, the disclosure provides a method of routing transmit signals to an antenna and routing receive signals to a receiver. The method includes providing a first hybrid coupler having a first frequency response and a second hybrid coupler having a second frequency response. The second hybrid coupler is coupled to the first hybrid coupler by a plurality of combiners. The second frequency response complements the first frequency response to cause cancellation of two signals arriving at an output port of the first hybrid coupler from two different paths through the first and second hybrid couplers.

According to this aspect, in some embodiments, the first hybrid coupler has a first port connected to an antenna, a second port connected to a splitter that splits a signal into different receive signals, a third port connected to an output port of a first one of the plurality of combiners and a fourth port connected to an output port of a second one of the plurality of combiners. In these embodiments, the second hybrid coupler may have a first port connected to an input port of the first one of the plurality of combiners and a second port connected to an input port of the second one of the plurality of combiners. In these embodiments, the second hybrid coupler may have a third port connected to a transmitter circuit and a fourth port connected to a load.

Figure 15:
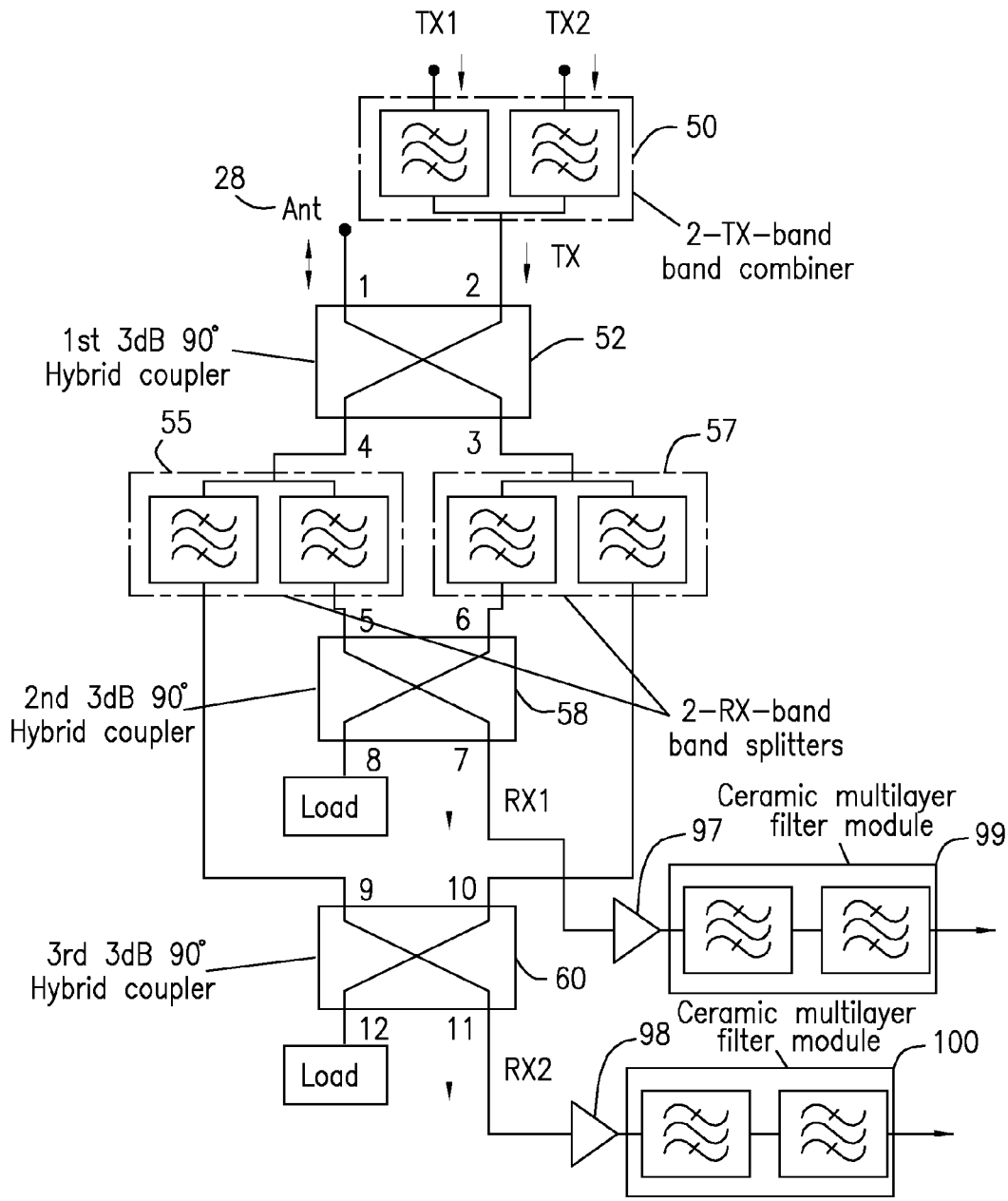
FIG. 15 is a block diagram of one embodiment of a four band multiplexer with downstream receive filtering constructed in accordance with principles of the present invention.

Returning to FIG. 7, note that the splitters 54 and 56 may include band pass filters (BPF) for each of the receive bands RX1 and RX2 that also reject the signals TX1 and TX2. In some embodiments, the BPFs of the splitters 54 and 56 may be SAW, BAW or FBAR filters. FIG. 15 shows the embodiment of FIG. 7 augmented with the 2-RX-band band splitters 55 and 57 comprising acoustic filters and, in the receive paths, low noise amplifiers 97 and 98, and ceramic multilayer filter modules 99 and 100. The receive signal RX1 is input to the low noise amplifier 97 followed by the ceramic multilayer filter module 99. Similarly, the receive signal RX2 is input to the low noise amplifier 98 followed by the ceramic multilayer filter module 100. In one embodiment, the ceramic multilayer filter modules 99 and 100 are low Q filters having a Q of about 100 to 200. In contrast, in one embodiment, the acoustic filters of the splitters 55 and 57 are high Q filters having a Q greater than 500 to 4000. In practice, the high Q of acoustic filters is desirable and helpful. However, the low out-of-band rejection of acoustic filters is undesirable. Conversely, the low Q of ceramic multilayer filter modules is undesirable, but the high out-of-band rejection achievable by cascaded ceramic multilayer filters is desirable and helpful. As is explained in more detail below, the combination of the splitters 55 and 57 with the ceramic multilayer filter modules 99 and 100 produces a frequency response that advantageously provides both high Q and high out-of-band rejection.

Figure 16:
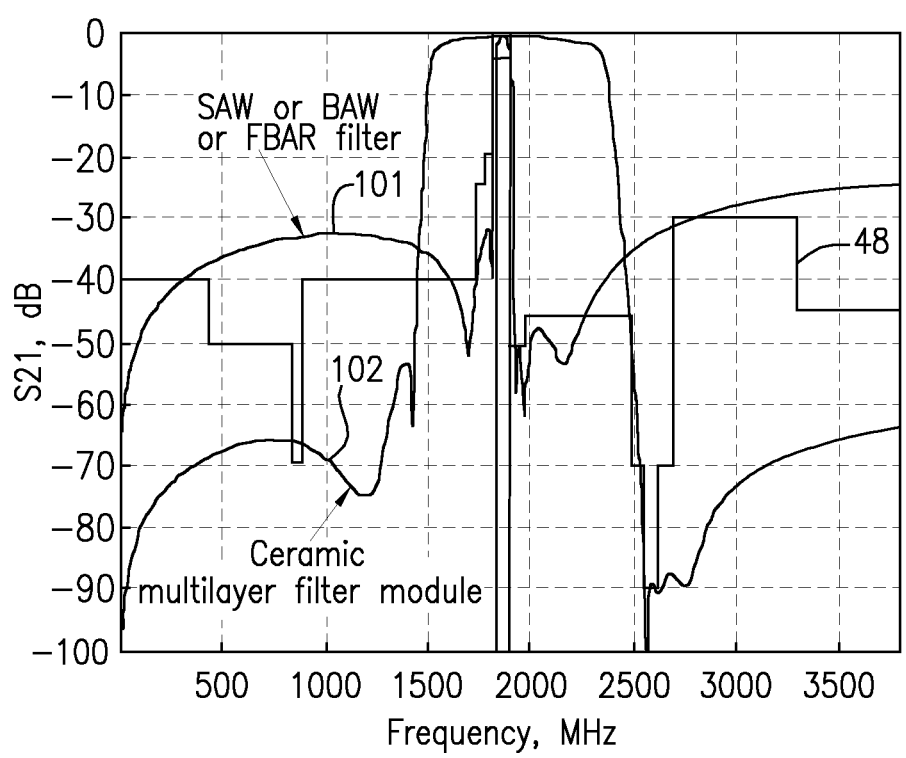
FIG. 16 is a graph of a frequency response of an acoustic filter and of a ceramic multilayer filter module.

FIG. 16 shows an acoustic filter frequency response, curve 101, and a ceramic multilayer filter module frequency response, curve 102. The rejection envelope requirements in accordance with an exemplary wireless communication standard, e.g., Long Term Evolution (LTE) band 2, are given by rejection envelope requirements 48. Note that the frequency response 101 of the acoustic filter does not meet the out-of-band rejection requirements, and that the frequency response 102 of the ceramic multilayer filter module has low Q showing a slow transition band.

Figure 4:
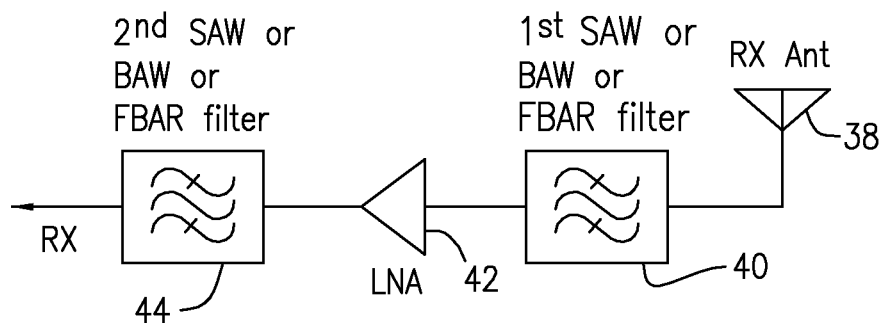
FIG. 4 is a block diagram of a known proposed single band receiver-only front end.
Figure 5:
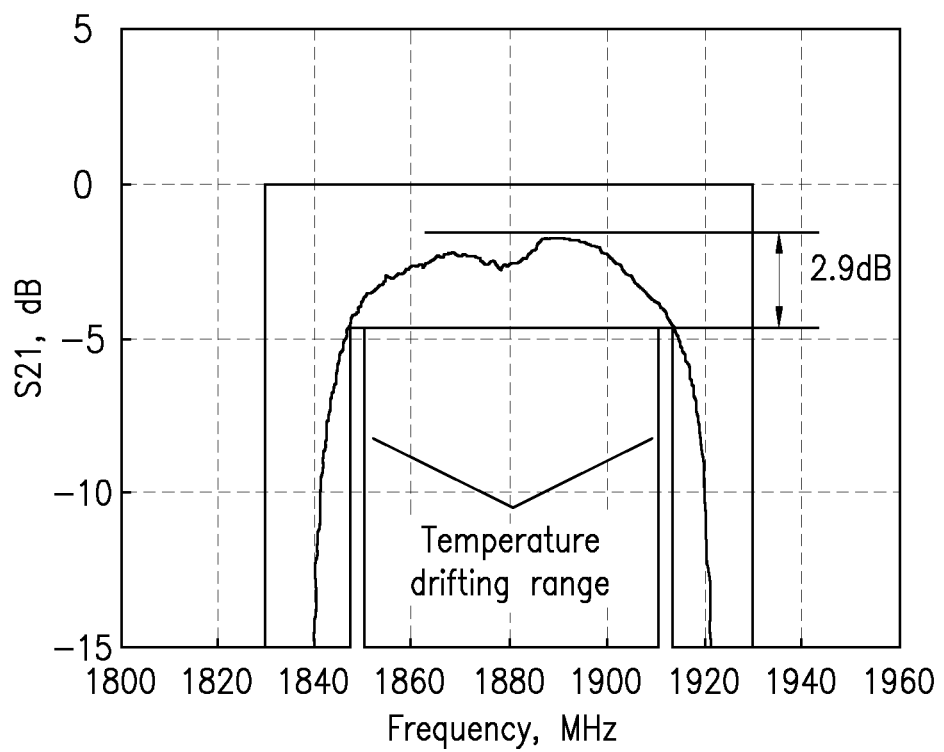
FIG. 5 is a graph of a frequency response of the configuration of FIG. 4.
Figure 6:
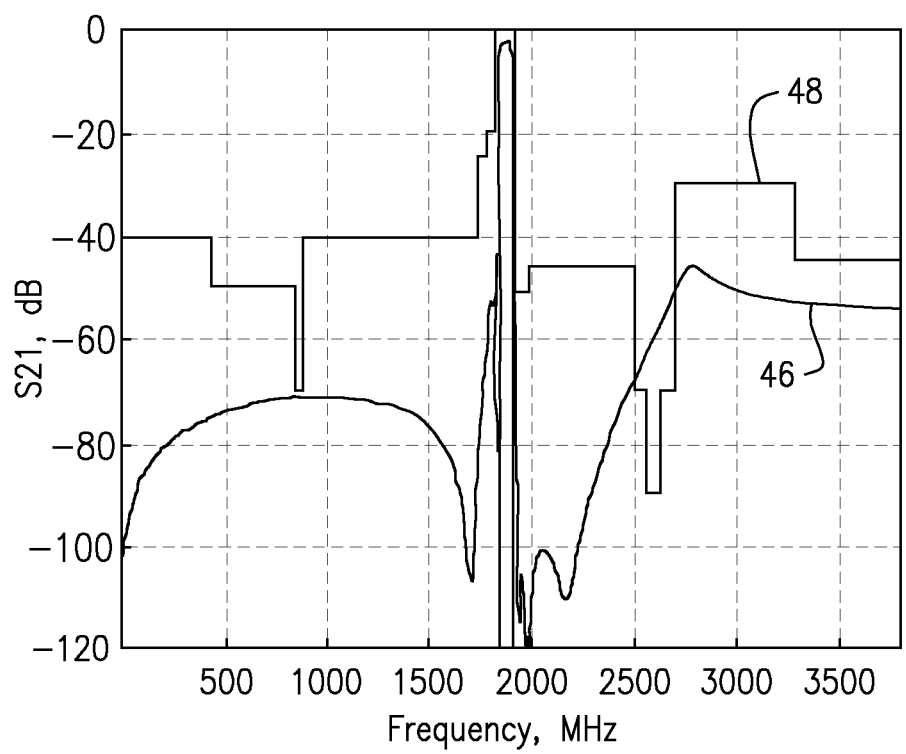
FIG. 6 is a graph of the out-of-band frequency response of the configuration of FIG. 4.
Figure 17:
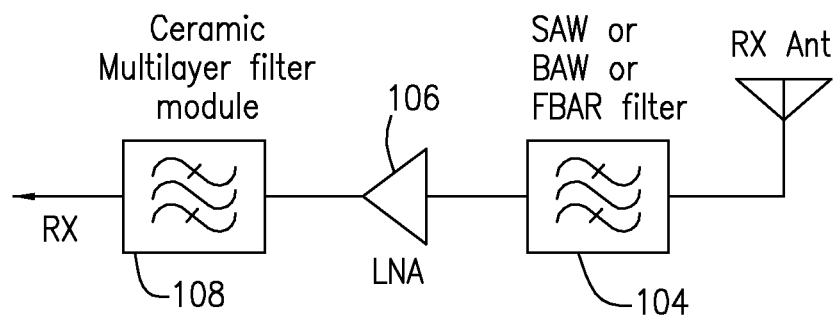
FIG. 17 is a block diagram of a first embodiment of a combination of an acoustic filter and a ceramic multilayer filter module.
Figure 18:
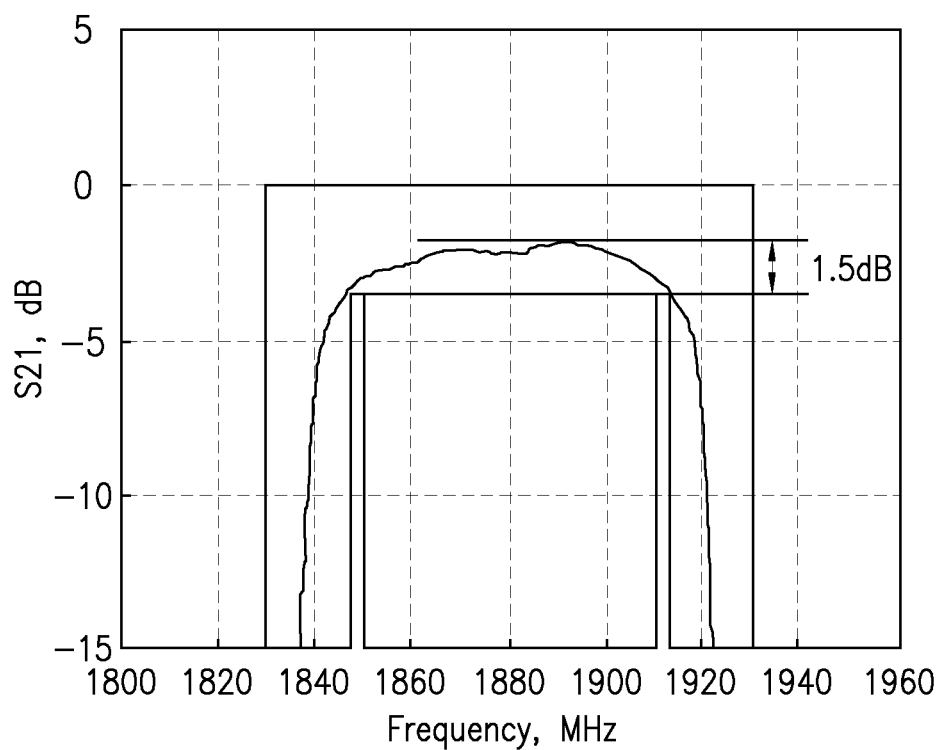
FIG. 18 is a frequency response of the pass band of the configuration of FIG. 17.
Figure 19:
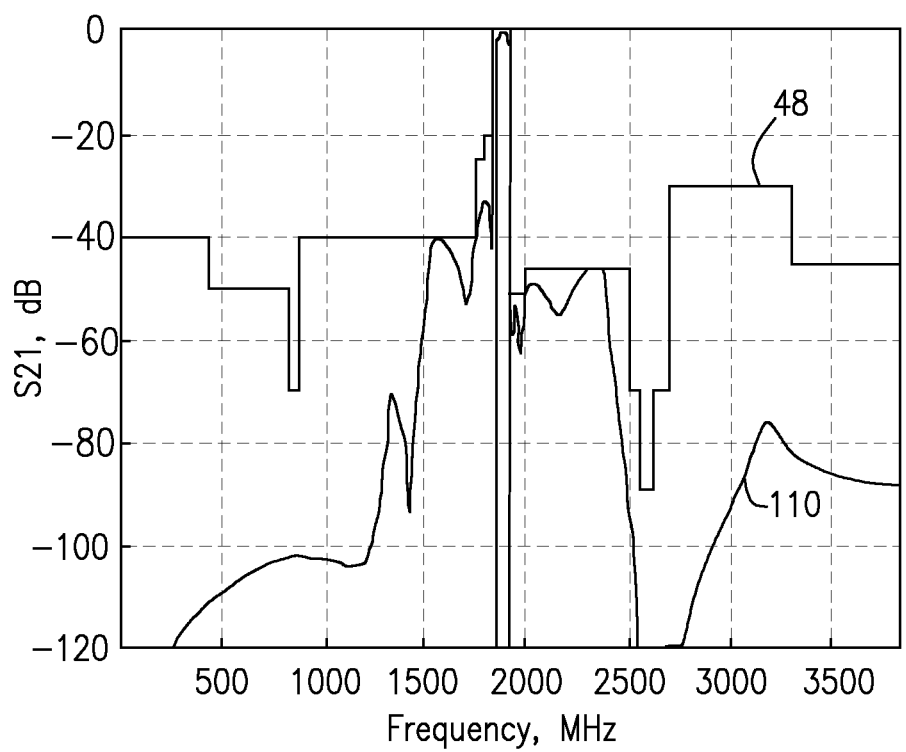
FIG. 19 is a frequency response of the out-of-band region of the configuration of FIG. 17.

FIG. 17 shows a first exemplary embodiment of a combination of the acoustic filter and the ceramic multilayer filter module, with the acoustic filter 104 in the signal path before the low noise amplifier (LNA) 106 of the receiver and with a ceramic multilayer filter module 108 in the signal path after the low noise amplifier. This combination yields a smaller pass band amplitude variation, as shown in FIG. 18, when compared to the pass band variation of FIG. 5 resulting from the configuration of FIG. 4. Less amplitude variation in the pass band decreases distortion of the receive signal. In one embodiment, a variation of 2.9 dB is unacceptable, but 1.5 dB may be acceptable. FIG. 19 shows that the composite frequency response 110 of the combination of acoustic and ceramic filters meets the high Q and out-of-band rejection envelope requirements 48. Note also that, because the loss of the filter between the antenna and the low noise amplifier makes a big contribution to the receiver path noise figure and since the acoustic filters have lower insertion loss than the conventional resonator type ceramic filters, the noise figure of the receive path in the embodiment of FIG. 17 will be lower than such filter-based existing RX front-end filter solutions.

Figure 20:
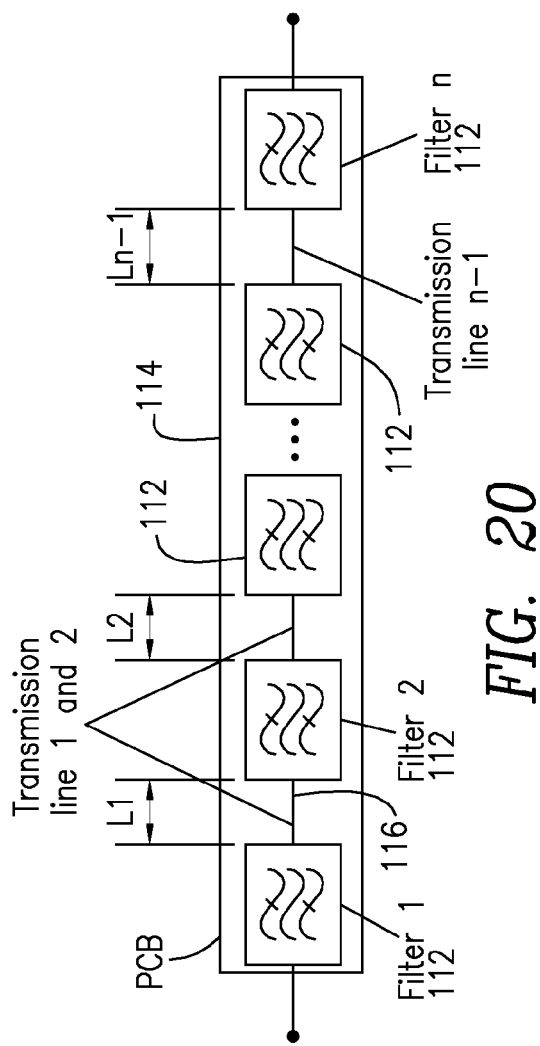
FIG. 20 is a block diagram of a ceramic multilayer filter module includes cascaded n ceramic multilayer filters separated by transmission lines on a printed circuit board.

FIG. 20 is a diagram of a ceramic multilayer filter module that includes cascaded ceramic multilayer filters 112 labeled filter 1, filter 2 . . . filter n, and formed on a printed circuit board 114. The ceramic multilayer filters 112 are separated by transmission lines 116. In one embodiment, low temperature co-fired ceramic (LTCC) multilayer filters usually have dimensions less than 4.5×3.2×1.9 millimeters. Some LTCC multilayer filters have dimensions as small as 1.6× 0.8×0.6 millimeters. This is much smaller than the conventional resonator type ceramic filters that have dimensions on the order of 50×15×10 millimeters or larger.

Note that since LTCC multilayer filters do not have a completely metal-sealed package outside the filter block, their filter performance may be affected by cross coupling with other nearby RF components, including other nearby LTCC filters. Therefore, in order to obtain good cascade filtering performance, three preferred cascading conditions may need to be satisfied. First, all LTCC multilayer filters should be of the same design. Second, ports of any two single LTCC multilayer filters connected by a transmission line should have the same individual port impedance.

Third, the lengths L1, L2 . . . Ln−1 (collectively referred to as length "L") of the transmission lines connecting two single LTCC multilayer filters can be optimized using a 3-dimensional electromagnetic (EM) simulation tool that accounts for the EM properties of the printed circuit board (PCB). Using the EM simulation tool, undesired spurious modes can be reduced or eliminated from the total cascading filter performance. These unwanted modes are generated from cross-coupling if length L is too short or from phase-mismatch due to an inappropriate length, L. Using common PCB materials, such as FR-4 and Rogers, etc., in one embodiment, the optimized distance L may be within the range of 1 mm to 7 mm. In one embodiment the lengths L1, L2, etc. are the same.

The PCB to be used for the cascaded LTCC multilayer filter module can be separate from or part of the common RX front end section PCB that carries the low noise amplifier and other RF front end components.

Figure 21:
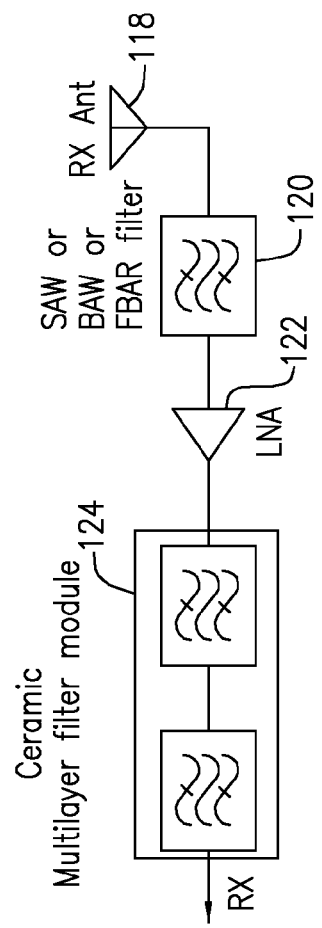
FIG. 21 is block diagram of a second embodiment of a combination of an acoustic filter and a ceramic multilayer filter module that includes two cascaded ceramic multilayer filters.
Figure 22:
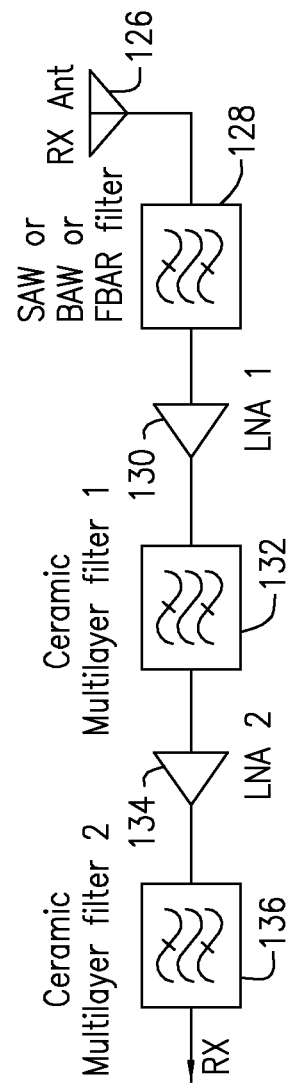
FIG. 22 is a block diagram of a third embodiment of a combination of an acoustic filter and a plurality of ceramic multilayer filters separated by low noise amplifiers.

FIG. 21 is a block diagram of a second embodiment of a receiver front end with a separate receive antenna 118, an acoustic filter 120 a low noise amplifier (LNA) 122 and a ceramic multilayer filter module 124. Thus, in the first embodiment, there is only one ceramic multilayer filter and in the second embodiment there is a cascade of multiple ceramic multilayer filters. More generally, the ceramic multilayer filter module 124 in FIG. 21 can be replaced by the ceramic multilayer filter module shown in FIG. 20. The second embodiment of FIG. 21 is the same embodiment shown in FIG. 15. I.e., the LNA 122 corresponds to the LNAs 97 and 98, and the ceramic filter module 124 corresponds to the ceramic filter modules 99 and 100. FIG. 22 is a block diagram of a third embodiment having a separate receive antenna 126, an acoustic filter 128, a first LNA 130, a first ceramic multilayer filter 132, a second LNA 134 and a second ceramic multilayer filter 136. This embodiment differs from embodiments 1 and 2 because in this embodiment, an LNA 134 is interposed between the two ceramic multilayer filters 132 and 136 so that cross coupling between the two ceramic multilayer filters is weak. Also, since the ceramic multilayer filter 136 is after the second LNA 134, the loss of the ceramic multilayer filter 136 should make only a very small contribution to the receive path noise figure. Further embodiments may include a cascade of additional ceramic multilayer filters separated by LNAs. The more ceramic multilayer filters that are cascaded, the greater will be the out-of-band rejection achieved. Of note, although FIG. 15 shows only the filter embodiment of FIG. 21, such is provided for illustration and ease of understanding only. It is contemplated that the embodiments of FIG. 17 or 22 can be used.

Figure 23:
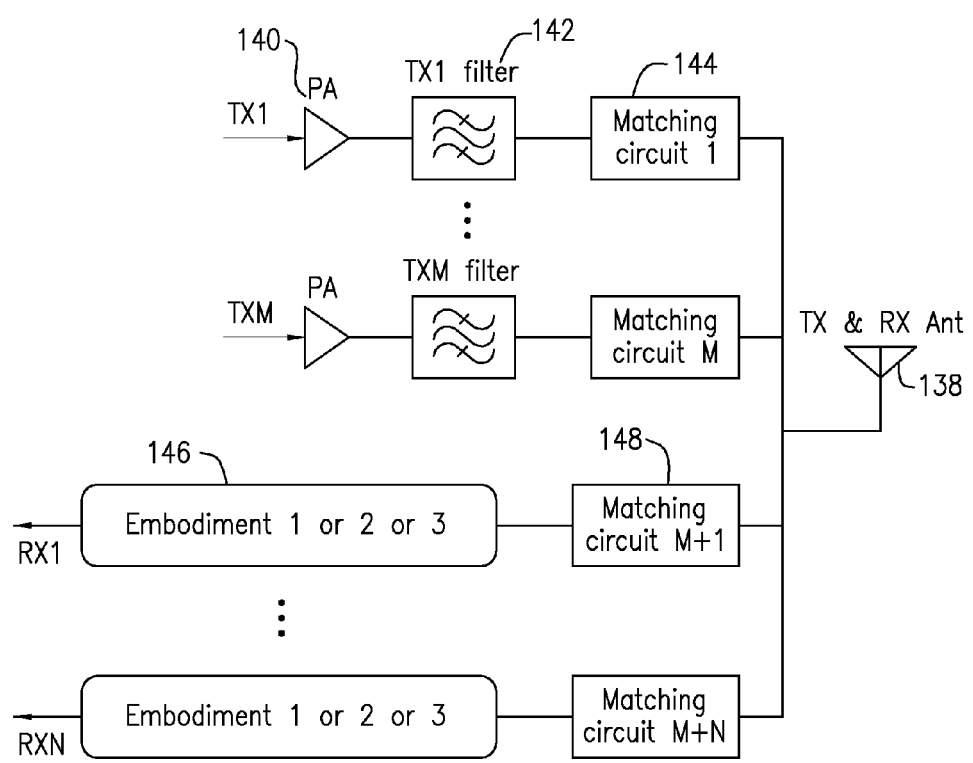
FIG. 23 is a block diagram of a shared antenna configuration of an RF front end with the first, second and third embodiments of the combination of acoustic and ceramic filters in the receive path.

FIG. 23 is a block diagram of an RF front end with an antenna 138 used to both receive and transmit wireless signals, such as might be used in Long Term Evolution (LTE) or other 3GPP wireless communication networks. In this configuration, a power amplifier 140 for amplifying a transmit signal TX is followed by a transmit filter 142 and a matching circuit 144, and is then electrically coupled to the antenna 138. The wireless communication signals received by the antenna 138 are coupled to matching circuits and filter circuits that may be any of embodiments 1-3 shown and described above with reference to FIGS. 17, 21 and 22.

Thus, embodiments include RF receive filters that combine the high Q of an acoustic filter with the good out-of-band rejection of a ceramic multilayer filter. These features can be combined with the multiplexers of FIGS. 7, 12, 13 and 14 to provide small, lower cost radio base stations with miniature filters.

An RF circuit in a receiver of a radio is provided in accordance with other aspects of the disclosure. The circuit includes an acoustic filter having a first pass band frequency characteristic, a first out-of-band frequency rejection characteristic and an output. A cascade of at least one amplifier is followed in series by at least one ceramic multilayer filter module, a first one of the at least one amplifier having an input electrically coupled to the output of the acoustic filter. Each one of the at least one ceramic multilayer filter module has a respective second pass band frequency characteristic and has a respective second out-of-band frequency rejection characteristic that exceeds the first out-of-band frequency rejection characteristic of the acoustic filter.

According to this aspect, in some embodiments, each ceramic multilayer filter module exhibits a Q that is less than a Q of the acoustic filter by a factor of at least two. In some embodiments, the respective second pass band amplitude of each one of the at least one ceramic multilayer filter varies less than the first pass band amplitude of the acoustic filter. In some embodiments, the acoustic filter is one of a surface acoustic wave (SAW) filter, a bulk acoustic wave (BAW) filter, and a thin film bulk acoustic resonator (FBAR). In some embodiments, the at least one ceramic multilayer filter module includes a low temperature co-fired ceramic, LTCC, multilayer filter. In some embodiments, at least one of the at least one ceramic multilayer filter module includes at least two concatenated ceramic multilayer filters separated by a distance L that is selected to reduce spurious modes generated by cross-coupling of the at least two concatenated ceramic multilayer filters and generated by phase mismatch between the at least two concatenated ceramic multilayer filters. In some embodiments, the at least one ceramic multilayer filter module includes at least two concatenated ceramic multilayer filters separated by a distance L that is greater and about 1 millimeter. In some embodiments, a filter of the at least one ceramic multilayer filter module has a largest physical dimension that is less than about 5 millimeters.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A multi-band radio frequency, RF, multiplexer for routing transmit signals to an antenna and routing receive signals to a receiver, the multiplexer comprising:
   a first hybrid coupler providing four ports, a first port configured to connect to an antenna, a second port being an input port and configured to receive an N-band transmit signal, N being an integer;
   a first M-band splitter connected to a third port of the first hybrid coupler, the first M-band splitter having a first set of M outputs, M being a positive integer greater than one;
   a second M-band splitter connected to a fourth port of the first hybrid coupler, the second M-band splitter having a second set of M outputs; and
   a plurality of hybrid couplers each providing four ports, a first port being connected to one of the first set of M outputs, and a second port being connected to one of the second set of M outputs, each of the plurality of hybrid couplers having a third port being an output port and configured to output one of M receive signals for one of M receive circuits and a fourth port connected to one of M loads, each of the plurality of hybrid couplers having a frequency response that complements a frequency response of the first hybrid coupler in a respective band so that a combined frequency response of the first hybrid coupler and one of the plurality of hybrid couplers causes cancellation of two signals arriving at an output port of the one of the plurality of hybrid couplers from two different paths through the hybrid couplers.

2. The multiplexer of claim 1, wherein each of the first and the plurality of hybrid couplers is a 3 dB 90 degree hybrid coupler.

3. The multiplexer of claim 1, wherein the first and second M-band splitters each have M filters and each filter of the first M-band splitter has a frequency response that corresponds to a frequency response of a corresponding filter of the second M-band splitter.

4. The multiplexer of claim 1, wherein the first M-band splitter comprises M band pass filters, each band pass filter of the first M-band splitter passing a different one of the M receive signals and rejecting the N-band transmit signal.

5. The multiplexer of claim 4, wherein the second M-band splitter comprises M band pass filters, each band pass filter of the second M-band splitter corresponding to a band pass filter of the first M-band splitter.

6. A multi-band radio frequency, RF, multiplexer for routing transmit signals to an antenna and routing receive signals to a receiver, the multiplexer comprising:
- a first hybrid coupler providing four ports, a first port configured to connect to an antenna, a second port being an input port and configured to receive an N-band transmit signal, N being an integer;
- a first M-band splitter connected to a third port of the first hybrid coupler, the first M-band splitter having a first set of M outputs, M being a positive integer greater than one;
- a second M-band splitter connected to a fourth port of the first hybrid coupler, the second M-band splitter having a second set of M outputs; and
- a plurality of hybrid couplers each providing four ports, a first port being connected to one of the first set of M outputs, and a second port being connected to one of the second set of M outputs, each of the plurality of hybrid couplers having a third port being an output port and configured to output one of M receive signals for one of M receive circuits and a fourth port connected to one of M loads, at least one of the M receive circuits including a cascade of at least one amplifier followed in series by at least one ceramic multilayer filter module.

7. The multiplexer of claim 6, wherein each filter of the first M-band splitter and each filter of the second M-band splitter includes an acoustic filter.

8. The multiplexer of claim 7, wherein an out-of-band frequency rejection characteristic of the at least one ceramic multilayer filter module exceeds an out-of-band frequency rejection characteristic of each of a corresponding two of the 2M acoustic filters.

9. The multiplexer of claim 7, wherein a pass band frequency characteristic of the at least one ceramic multilayer filter module varies less than a pass band frequency characteristic of a corresponding one of the acoustic filters.

10. A multi-band radio frequency, RF, multiplexer for routing transmit signals to an antenna and routing receive signals to a receiver, the multiplexer comprising:
- a first hybrid coupler providing four ports, a first port being an output port connected to an N-band splitter configured to produce N receive signals to couple to N receive circuits, N being an integer, the first hybrid coupler having a second port connected to the antenna;
- a first M-band combiner connected to a third port of the first hybrid coupler, the first M-band combiner having a first set of M inputs, M being a positive integer greater than one;
- a second M-band combiner connected to a fourth port of the first hybrid coupler, the second M-band combiner having a second set of M inputs; and
- a plurality of hybrid couplers each providing four ports, a first port being connected to one of the first set of M inputs, and a second port being connected to one of the second set of M inputs, each of the plurality of hybrid couplers having a third port being an input port and connected to one of M transmit circuits and a fourth port connected to one of M loads, each of the plurality of hybrid couplers having a frequency response that complements a frequency response of the first hybrid coupler in a respective band so that a combined frequency response of the first hybrid coupler and one of the plurality of hybrid couplers causes cancellation of two signals arriving at an output port of the first hybrid coupler from two different paths through the hybrid couplers.

11. The multiplexer of claim 10, wherein each of the first and the plurality of hybrid couplers is a 3 dB 90 degree hybrid coupler.

12. The multiplexer of claim 10, wherein at least one of the N receive circuits includes a cascade of at least one amplifier followed in series by at least one ceramic multilayer filter module, a first one of the at least one amplifier having an input electrically coupled to a respective Nth output of the N-band splitter.

13. The multiplexer of claim 10, wherein the N-band splitter comprises a plurality of acoustic filters, one acoustic filter for each of the N receive signals.

14. The multiplexer of claim 13, wherein at least one of the N receive signals is coupled to a cascade of at least one amplifier followed in series by at least one ceramic multilayer filter module.

15. The multiplexer of claim 14, wherein an out-of-band frequency rejection characteristic of the at least one ceramic multilayer filter module exceeds an out-of-band frequency rejection characteristic of a corresponding one of the N acoustic filters.

16. The multiplexer of claim 14, wherein a pass band frequency characteristic of the at least one ceramic multilayer filter module varies less than a pass band frequency characteristic of a corresponding one of the acoustic filters.

17. The multiplexer of claim 10, wherein the first M-band combiner comprises M band pass filters, each band pass filter of the first M-band combiner passing a different one of M transmit signals and rejecting the N receive signals.

18. The multiplexer of claim 17, wherein the second M-band combiner comprises M band pass filters, each band pass filter of the second M-band combiner corresponding to a band pass filter of the first M-band combiner.

* * * * *